US010769036B2

(12) United States Patent
Earl et al.

(10) Patent No.: US 10,769,036 B2
(45) Date of Patent: Sep. 8, 2020

(54) DISTRIBUTED TRANSACTION LOG

(71) Applicant: VMware, Inc., Palo Alto, CA (US)

(72) Inventors: William Earl, Boulder Creek, CA (US); Christos Karamanolis, Los Gatos, CA (US); Eric Knauft, Palo Alto, CA (US); Pascal Renauld, Palo Alto, CA (US)

(73) Assignee: VMware, Inc., Palo Alto, CA (US)

( * ) Notice: Subject to any disclaimer, the term of this patent is extended or adjusted under 35 U.S.C. 154(b) by 375 days.

(21) Appl. No.: 15/810,650

(22) Filed: Nov. 13, 2017

(65) Prior Publication Data
US 2018/0067826 A1 Mar. 8, 2018

Related U.S. Application Data

(63) Continuation of application No. 14/469,526, filed on Aug. 26, 2014, now Pat. No. 9,830,234.

(60) Provisional application No. 61/870,149, filed on Aug. 26, 2013.

(51) Int. Cl.
*G06F 11/14* (2006.01)
*H04L 29/08* (2006.01)
*G06F 16/176* (2019.01)
*G06F 16/18* (2019.01)
*G06F 16/23* (2019.01)
*G06F 9/455* (2018.01)

(52) U.S. Cl.
CPC ...... *G06F 11/1471* (2013.01); *G06F 16/1774* (2019.01); *G06F 16/1815* (2019.01); *G06F 16/2365* (2019.01); *H04L 67/1097* (2013.01); G06F 2009/45579 (2013.01)

(58) Field of Classification Search
CPC ............ G06F 11/1471; G06F 16/2365; G06F 16/1815; G06F 16/1774; G06F 2009/45579; H04L 67/1097
USPC .................................................. 707/674, 703
See application file for complete search history.

(56) References Cited

U.S. PATENT DOCUMENTS

| 6,098,079 A  * | 8/2000  | Howard  | G06F 16/137 707/E17.007 |
| 7,447,710 B2 * | 11/2008 | Sampath | G06F 11/1471 707/999.202 |
| 7,451,286 B2 * | 11/2008 | Nadathur | G06F 11/1458 711/162 |
| 8,806,550 B1 * | 8/2014  | Chan    | H04N 17/004 725/100 |

(Continued)

*Primary Examiner* — Phong H Nguyen
(74) *Attorney, Agent, or Firm* — Fish & Richardson P.C.

(57) ABSTRACT

Embodiments of the disclosure provide techniques for updating a distributed transaction log on a previously offline resource object component using distributed transaction logs from active host computer nodes from separate RAID mirror configurations. Each component object maintains a journal (log) where distributed transactions are recorded. If a component object goes offline and subsequently returns (e.g., if the node hosting the component object reboots), the component object is marked as stale. To return the component object to an active state, a distributed resources module retrieves the journals from other resource component objects from other RAID configurations where the data is mirrored. The module filters corresponding data that is missing in the journal of the previously offline corresponding object and merges the filtered data to the journal.

21 Claims, 6 Drawing Sheets

(56) References Cited

U.S. PATENT DOCUMENTS

| | | | | |
|---|---|---|---|---|
| 9,501,501 | B2 * | 11/2016 | Madhavarapu | G06F 16/2358 |
| 10,031,813 | B2 * | 7/2018 | Madhavarapu | G06F 16/27 |
| 2002/0049776 | A1 * | 4/2002 | Aronoff | G06F 16/27 |
| | | | | 707/E17.007 |
| 2003/0140086 | A1 * | 7/2003 | Bollella | G06F 9/4812 |
| | | | | 718/108 |
| 2005/0131853 | A1 * | 6/2005 | Sampath | G06F 11/2028 |
| | | | | 714/E11.207 |
| 2005/0289152 | A1 * | 12/2005 | Earl | G06F 16/184 |
| | | | | 707/E17.01 |
| 2006/0059485 | A1 * | 3/2006 | Onufryk | G06F 9/4881 |
| | | | | 718/100 |
| 2006/0075335 | A1 * | 4/2006 | Gloor | G06T 11/206 |
| | | | | 715/273 |
| 2006/0253731 | A1 * | 11/2006 | Petruzzo | G06F 11/1464 |
| | | | | 714/6.2 |
| 2008/0022058 | A1 * | 1/2008 | Nadathur | G06F 11/1461 |
| | | | | 711/162 |
| 2010/0030754 | A1 * | 2/2010 | Petruzzo | G06F 11/1456 |
| | | | | 707/640 |
| 2010/0169284 | A1 * | 7/2010 | Walter | G06F 11/1474 |
| | | | | 707/682 |
| 2013/0218840 | A1 * | 8/2013 | Smith | G06F 11/1662 |
| | | | | 707/639 |
| 2014/0006194 | A1 * | 1/2014 | Xie | G06Q 30/04 |
| | | | | 705/21 |
| 2017/0075767 | A1 * | 3/2017 | Madhavarapu | G06F 16/27 |

* cited by examiner

DISTRIBUTED TRANSACTION LOG

CROSS-REFERENCE TO RELATED APPLICATION(S)

This application is a continuation of U.S. application Ser. No. 14/469,526, filed Aug. 26, 2014, which claims the benefit of U.S. Provisional Application No. 61/870,149, filed Aug. 26, 2013, each of which is incorporated herein by reference in its entirety.

BACKGROUND

Distributed systems allow multiple clients in a network to access a pool of shared resources. For example, a distributed storage system allows a cluster of host computers to aggregate local disks (e.g., SSD, PCI-based flash storage, SATA, or SAS magnetic disks) located in or attached to each host computer to create a single and shared pool of storage. This pool of storage (sometimes referred to herein as a "datastore" or "store") is accessible by all host computers in the cluster and may be presented as a single namespace of storage entities (such as a hierarchical file system namespace in the case of files, a flat namespace of unique identifiers in the case of objects, etc.). Storage clients in turn, such as virtual machines spawned on the host computers may use the datastore, for example, to store virtual disks that are accessed by the virtual machines during their operation. Because the shared local disks that make up the datastore may have different performance characteristics (e.g., capacity, input/output operations per second or IOPS capabilities, etc.), usage of such shared local disks to store virtual disks or portions thereof may be distributed among the virtual machines based on the needs of each given virtual machine.

This approach provides enterprises with cost-effective performance. For instance, distributed storage using pooled local disks is inexpensive, highly scalable, and relatively simple to manage. Because such distributed storage can use commodity disks in the cluster, enterprises do not need to invest in additional storage infrastructure. However, one issue with such a distributed system is in failure recovery for nodes that return to the cluster after being offline for a period. For example, if a cluster node goes offline (e.g., due to a power outage), active and visible nodes in the cluster still perform regular transactions as designed, but one consequence of this is that if the offline node returns to the cluster, the node and corresponding resource component objects of the node are not up-to-date with the current state of the cluster and the operations previously performed on the component objects. In that state, the previously offline node is unusable in the cluster, which is ultimately inefficient because the distributed resources system is not using all of the resources available in the cluster.

SUMMARY

One or more embodiments disclosed herein provide a method for updating a distributed transaction log of a previously offline resource component object in a distributed resources system. The method generally includes retrieving distributed transaction logs from one or more active resource component objects. The method also generally includes sending, in parallel, the distributed transaction logs to the previously offline resource component object. The method also generally includes filtering, from each distributed transaction log of one or more component objects, corresponding data missing from the distributed transaction log of the previously offline resource component object. The method also generally includes merging the corresponding data to the distributed transaction log of the previously offline resource component object. The method also generally includes a mechanism for persisting the fact that a resource component has become stale on a majority of the resource components in the object, before making progress without the offline resource component, and using this information to prevent the stale component from servicing operations on the object until it has been brought up to date by the aforementioned resynchronization methods. In this way a "live set" of resource components with up-to-date data is maintained where components are subtracted from the set when they become stale, and are re-added only after resynchronization.

Other embodiments include, without limitation, a computer-readable medium that includes instructions that enable a processing unit to implement one or more aspects of the disclosed methods as well as a system having a processor, memory, and application programs configured to implement one or more aspects of the disclosed methods.

DETAILED DESCRIPTION

Figure 1:
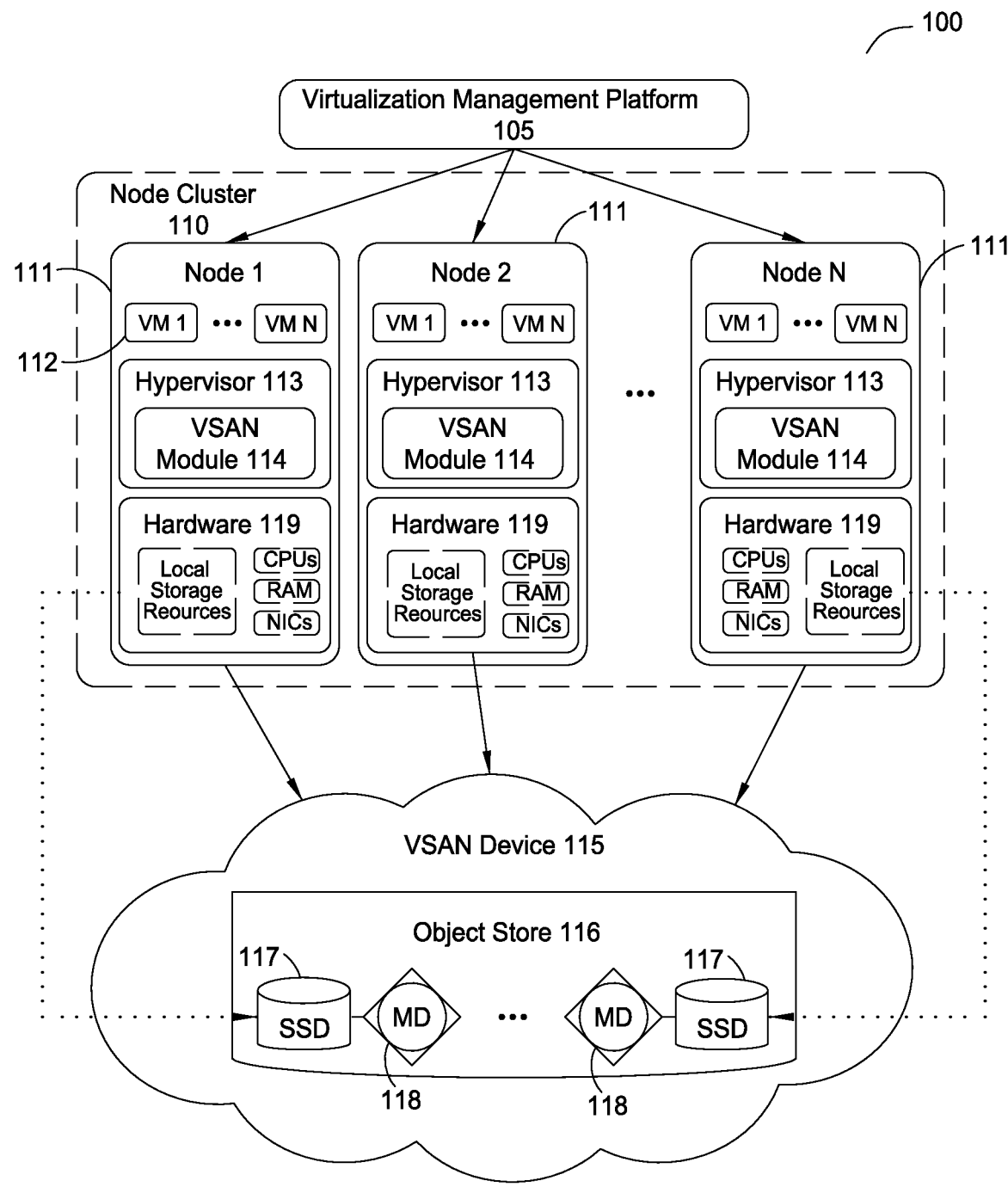
FIG. 1 illustrates an example computing environment, according to one embodiment.

Embodiments disclosed herein provide techniques for data recovery in a distributed resources system. More specifically, the techniques use transaction logs (or journals) of currently active resource component objects of a RAID layout in the system to resynchronize stale component objects (i.e., previously offline components). In one embodiment, host computer nodes forming a cluster in the distributed resources system perform actions on resource objects through distributed transactions. Each cluster node maintains a journal on each resource object component for recording the transactions. In the event that a component (or the node on which the component resides) goes offline and subsequently returns online some time later, the previously missing component may be out-of-sync with the other components (e.g., due to actions performed on the resource object while the component was offline). A distributed storage module resynchronizes the "stale" component by sending the journals of each of the components of the live set (i.e., the set of currently active and visible nodes) to the stale component. The stale component updates the journal hosted on the component using relevant data journals received. Once the update is complete, the module updates the live set of the new cluster status. The aforementioned techniques for data recovery require distributed knowledge of which resource components are stale in order to prevent them from servicing operations with stale data. Up-to-date information about which resource components are stale is obtained by querying a majority of the resource components belonging to an object. In one embodiment, the distributed knowledge is encoded as a configuration data structure containing an entry for each resource component identifying its state, which may be ACTIVE, STALE, or any other state that is useful to the embodiment. In this embodiment, such data is sent over the network to each resource component and persisted as metadata, which can later be retrieved.

For instance, the techniques described herein may apply to a distributed storage system where each host computer maintains records of distributed transactions performed on storage resources in a journal. One example of an applicable distributed storage system is a software-based "virtual storage area network" (VSAN) where host servers in a cluster each act as a node that contributes its commodity local storage resources (e.g., hard disk and/or solid state drives, etc.) to provide an aggregate "object" store. Each host server may include a storage management module (also referred to herein as a VSAN module) in order to automate storage management workflows (e.g., create objects in the object store, etc.) and provide access to objects in the object store (e.g., handle I/O operations to objects in the object store, etc.) based on predefined storage policies specified for objects in the object store. In one particular embodiment, the host servers further support the instantiation of virtual machines (VMs) which act as clients to the VSAN object store. In such an embodiment, the "objects" stored in the object store may include, for example, file system objects that may contain VM configuration files and virtual disk descriptor files, virtual disk objects that are accessed by the VMs during runtime and the like. The storage objects may comprise components from multiple disks on different nodes. Further, the VSAN modifies the storage objects using distributed transactions to each component object in the cluster. The VSAN uses distributed transaction journals to record transactions performed as well as persist data.

Reference is now made in detail to several embodiments, examples of which are illustrated in the accompanying figures. Note, that wherever practicable, similar or like reference numbers may be used in the figures and may indicate similar or like functionality. The figures depict embodiments for purposes of illustration only. One of skill in the art will readily recognize from the following description that alternative embodiments of the structures and methods illustrated herein may be employed without departing from the principles described herein.

In the following, an example of a software-defined storage area network in a virtualized computing environment is used as a reference example of recording distributed transactions in a distributed resources system to logs and using the logs in disk recovery. This reference example is included to provide an understanding of the embodiments described herein. However, it will be apparent to one of skill in the art that embodiments are applicable in other contexts related using distributed transaction logs to perform disk recovery.

Similarly, numerous specific details are provided to provide a thorough understanding of the embodiments. One of skill in the art will recognize that the embodiments may be practiced without some of these specific details. In other instances, well known process operations and implementation details have not been described in detail to avoid unnecessary obscuring novel aspects of the disclosure.

FIG. 1 illustrates a computing environment 100, according to one embodiment. As shown, computing environment 100 is a VSAN environment that leverages the commodity local storage housed in or directly attached (hereinafter, use of the term "housed" or "housed in" may be used to encompass both housed in or otherwise directly attached) to host servers or nodes 111 of a cluster 110 to provide an aggregate object store 116 to virtual machines (VMs) 112 running on the nodes. The local commodity storage housed in or otherwise directly attached to the nodes 111 may include combinations of solid state drives (SSDs) 117 and/or magnetic or spinning disks 118. In certain embodiments, SSDs 117 serve as a read cache and/or write buffer in front of magnetic disks 118 to increase I/O performance.

A virtualization management platform 105 is associated with cluster 110 of nodes 111. Virtualization management platform 105 enables an administrator to manage the configuration and spawning of VMs on the various nodes 111. As depicted in the embodiment of FIG. 1, each node 111 includes a virtualization layer or hypervisor 113, a VSAN module 114, and hardware 119 (which includes the SSDs 117 and magnetic disks 118 of a node 111). Through hypervisor 113, a node 111 is able to launch and run multiple VMs 112. Hypervisor 113, in part, manages hardware 119 to properly allocate computing resources (e.g., processing power, random access memory, etc.) for each VM 112. Furthermore, as described further below, each hypervisor 113, through its corresponding VSAN module 114, provides access to storage resources located in hardware 119 (e.g., SSDs 117 and magnetic disks 118) for use as storage for virtual disks (or portions thereof) and other related files that may be accessed by any VM 112 residing in any of nodes 111 in cluster 110. In a particular embodiment, vSphere Hypervisor from VMware, Inc. (VMware) may be installed on nodes 111 as hypervisor 113 and vCenter Server from VMware may be used as virtualization management platform 105.

In one embodiment, VSAN module 114 is implemented as a "VSAN" device driver within hypervisor 113. In such an embodiment, VSAN module 114 provides access to a conceptual "VSAN" 115 through which an administrator can create a number of top-level "device" or namespace objects that are backed by object store 116. In one common scenario, during creation of a device object, the administrator may specify a particular file system for the device object (such device objects hereinafter also thus referred to "file system objects"). For example, in one embodiment, each hypervisor 113 in each node 111 may, during a boot process, discover a /vsan/ root node for a conceptual global namespace that is exposed by VSAN module 114. By, for example, accessing APIs exposed by VSAN module 114, hypervisor 113 can then determine all the top-level file system objects (or other types of top-level device objects) currently residing in VSAN 115. When a VM (or other client) attempts to access one of the file system objects, hypervisor 113 may dynamically "auto-mount" the file system object at that time. A file system object (e.g., /vsan/fs_name1, etc.) that is accessible through VSAN 115 may, for example, be implemented to emulate the semantics of a particular file system such as VMware's distributed or clustered file system, VMFS, which is designed to provide concurrency control among simultaneously accessing VMs. Because VSAN 115 supports multiple file system objects, it is able provide storage resources through object store 116 without being confined by limitations of any particular clustered file system. For example, many clustered file systems (e.g., VMFS, etc.) can only scale to support a certain amount of nodes 111. By providing multiple top-level file system object support, VSAN 115 overcomes the scalability limitations of such clustered file systems.

As described in further detail in the context of FIG. 2 below, a file system object, may, itself, provide access to a number of virtual disk descriptor files (e.g., .vmdk files in a vSphere environment, etc.) accessible by VMs 112 running in cluster 110. These virtual disk descriptor files contain references to virtual disk "objects" that contain the actual data for the virtual disk and are separately backed by object store 116. A virtual disk object may itself be a hierarchical or "composite" object that, as described further below, is further composed of "component" objects (again separately backed by object store 116) that reflect the storage requirements (e.g., capacity, availability, IOPs, etc.) of a corresponding storage profile or policy generated by the administrator when initially creating the virtual disk. As further discussed below, each VSAN module 114 (through a cluster level object management or "CLOM" sub-module, in embodiments as further described below) communicates with other VSAN modules 114 of other nodes 111 to create and maintain an in-memory metadata database (e.g., maintained separately but in synchronized fashion in the memory of each node 111) that contains metadata describing the locations, configurations, policies and relationships among the various objects stored in object store 116. This in-memory metadata database is utilized by a VSAN module 114 on a node 111, for example, when an administrator first creates a virtual disk for a VM as well as when the VM is running and performing I/O operations (e.g., read or write) on the virtual disk. As further discussed below in the context of FIG. 3, VSAN module 114 (through a distributed object manager or "DOM" sub-module, in one embodiment as further described below) traverses a hierarchy of objects using the metadata in the in-memory database in order to properly route an I/O operation request to the node (or nodes) that houses (house) the actual physical local storage that backs the portion of the virtual disk that is subject to the I/O operation.

In one embodiment, the currently active and visible nodes 111 in cluster 110 is a live set. Further, although the interaction between nodes 111 is largely peer-based, one node 111 in cluster 110 is designated as a "master" node. The master node is responsible for disseminating updates to an in-memory database maintained by the VSAN module 114 of each node 111 (described in further detail below). The in-memory database serves as a cluster membership directory and stores information regarding each node 111, such as inventory, resources, and object configurations. If any one node 111 makes an update to the in-memory database within the given node 111, node 111 also forwards the update information to the "master" node, upon which the "master" node 111 propagates the update information to other nodes 111 in cluster 110. For example, if a node 111 goes offline, the "master" node 111 designates the node and hosted components as unhealthy. The distributed object manager for the composite object will then mark the component object as stale. If node 111 comes back, the stale component object on node 111 is unable to rejoin the live set until it is updated with any missing data from when node 111 was offline.

Figure 2:
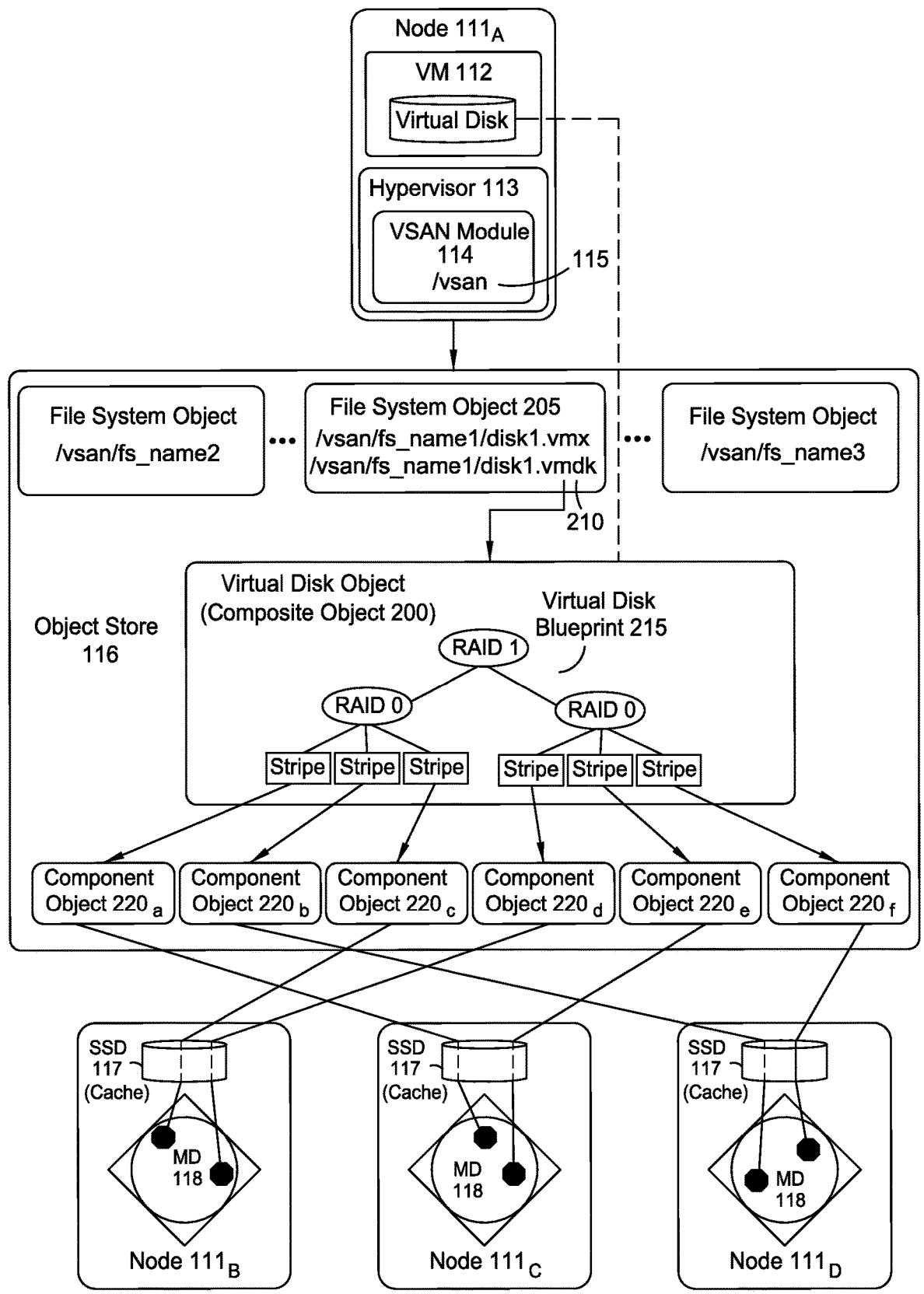
FIG. 2 illustrates an example hierarchical structure of objects organized within an object store that represent a virtual disk, according to one embodiment.

FIG. 2 illustrates an example hierarchical structure of objects organized within object store 116 that represent a virtual disk, according to one embodiment. As previously discussed above, a VM 112 running on one of nodes 111 may perform I/O operations on a virtual disk that is stored as a hierarchical or composite object 200 in object store 116. Hypervisor 113 provides VM 112 access to the virtual disk by interfacing with the abstraction of VSAN 115 through VSAN module 114 (e.g., by auto-mounting the top-level file system object corresponding to the virtual disk object, as previously discussed, in one embodiment). For example, VSAN module 114, by querying its local copy of the in-memory metadata database, is able to identify a particular file system object 205 (e.g., a VMFS file system object in one embodiment, etc.) stored in VSAN 115 that stores a descriptor file 210 for the virtual disk (e.g., a .vmdk file, etc.). It should be recognized that the file system object 205 may store a variety of other files consistent with its purpose, such as virtual machine configuration files (e.g., .vmx files in a vSphere environment, etc.) and the like when supporting a virtualization environment. In certain embodiments, each file system object may be configured to support only those virtual disks corresponding to a particular VM (e.g., a "per-VM" file system object).

Descriptor file 210 includes a reference to composite object 200 that is separately stored in object store 116 and conceptually represents the virtual disk (and thus may also be sometimes referenced herein as a virtual disk object). Composite object 200 stores metadata describing a storage organization or configuration for the virtual disk (sometimes referred to herein as a virtual disk "blueprint") that suits the storage requirements or service level agreements (SLAs) in a corresponding storage profile or policy (e.g., capacity, availability, IOPs, etc.) generated by an administrator when creating the virtual disk. For example, in the embodiment of FIG. 2, composite object 200 includes a virtual disk blueprint 215 that describes a RAID 1 configuration where two mirrored copies of the virtual disk (e.g., mirrors) are each further striped in a RAID 0 configuration. Composite object 225 may thus contain references to a number of "leaf" or "component" objects $220_x$ corresponding to each stripe (e.g., data partition of the virtual disk) in each of the virtual disk mirrors. The metadata accessible by VSAN module 114 in the in-memory metadata database for each component object 220 (e.g., for each stripe) provides a mapping to or otherwise identifies a particular node $111_x$ in cluster 110 that houses the physical storage resources (e.g., magnetic disks 118, etc.) that actually store the stripe (as well as the location of the stripe within such physical resource).

Further, an "owner" node of composite object 225 (designated by an election protocol in a directory service of cluster 110) coordinates transactions to corresponding component objects $220_x$. Further, the "owner" node serves as a commit coordinator for the transaction. VSAN module 114 sends a request to prepare a change to each participating component. VSAN module 114 returns a completion as soon as all of the prepare requests have been completed. If the prepare request fails, VSAN module 114 aborts the transaction.

In one embodiment, each component object 220 includes a journal that acts as a distributed transactions log on component object 220. That is, the VSAN module 114 on each node 111 modifies component objects 220 using distributed transactions. Whenever the VSAN module performs a distributed transaction on a particular component object 220, VSAN module 114 records entries in the corresponding journal describing the transaction. Each of the entries includes a sequence identifier that increments with each additional transaction added to the journal. VSAN module 114 uses the sequence identifiers to reconcile the entries on different journals. For example, if the node 111 which owns an object goes offline (e.g., due to a power failure), and loses its knowledge of in-flight transactions, the VSAN module 114 on another node 111 compares the content of the journals using the sequence identifiers. Continuing the example, if the journal on node $111_C$ includes a write operation performed on node 111$_B$ that should have also been performed on node 111$_C$ (i.e., only node 111$_B$ was sent the write operation before the power failure), node 111$_B$, through its VSAN module 114, delivers the copy of the write operation to node 111$_B$.

Another case arises where a single node 111 goes offline and returns some time later. For example, assume that node 111$_B$ reboots and returns after five minutes. In this case, component objects 220$_C$ and 220$_D$, for example, may have journals that are not up-to-date. VSAN module 114 marks component objects 220$_x$ on node 111$_B$ as "stale," and no longer part of the live set of nodes component objects 220 (i.e., the component objects that are currently active and visible). As a result, before node 111$_B$ is able to perform any further operations as a part of the live set, the node 111$_B$ updates the hosted component objects 220$_x$ with journal information from the live set of nodes that have also have a copy of component object 220$_X$. Upon completely updating the journals on node 111$_B$, it returns to the live set and is subsequently able to perform operations on component objects 220.

Figure 3:
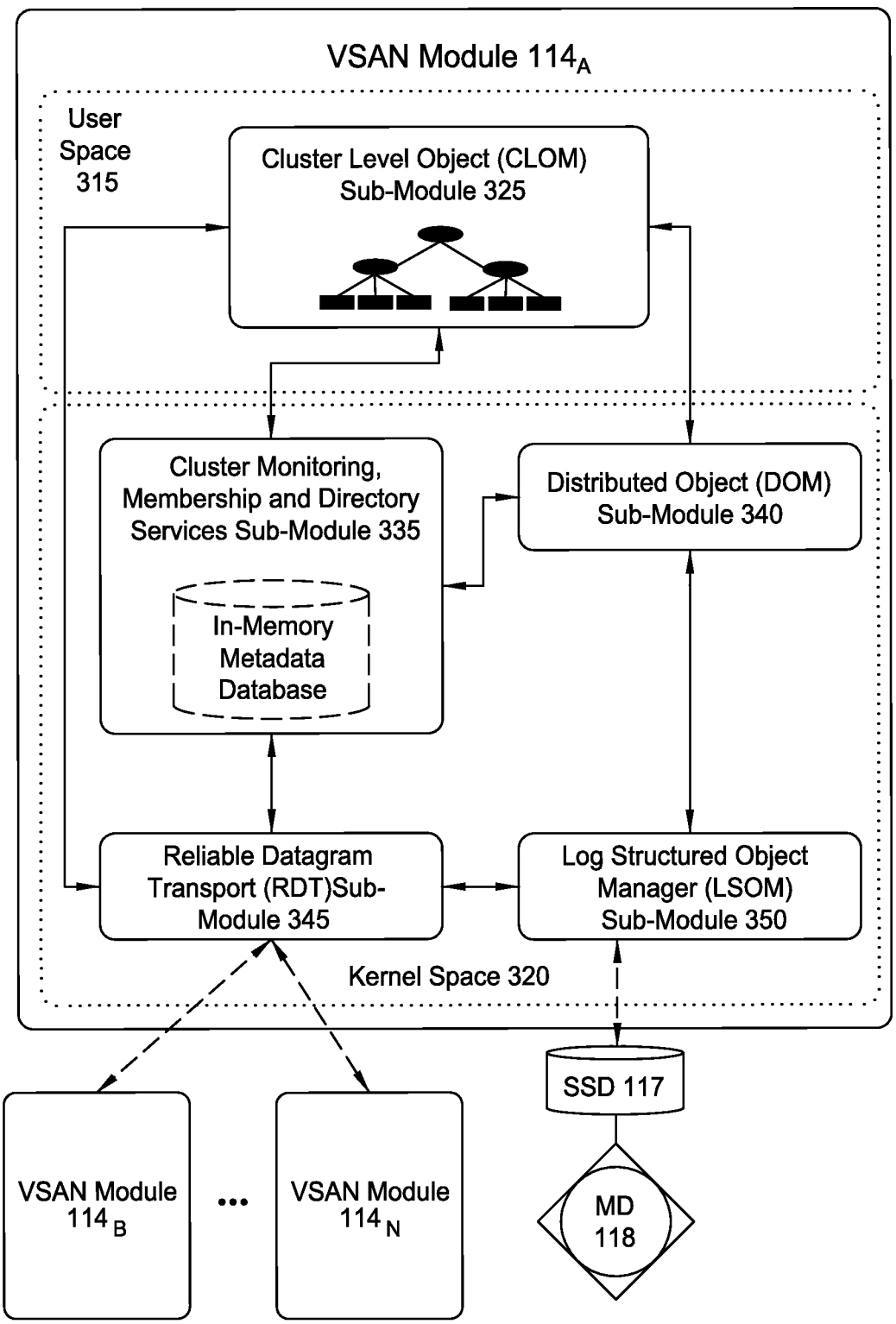
FIG. 3 illustrates components of a VSAN module, according to one embodiment.

FIG. 3 illustrates components of a VSAN module 114, according to one embodiment. As previously described, in certain embodiments, VSAN module 114 may execute as a device driver exposing an abstraction of a VSAN 115 to hypervisor 113. Various sub-modules of VSAN module 114 handle different responsibilities and may operate within either user space 315 or kernel space 320 depending on such responsibilities. As depicted in the embodiment of FIG. 3, VSAN module 114 includes a cluster level object management (CLOM) sub-module 325 that operates in user space 315. CLOM sub-module 325 generates virtual disk blueprints during creation of a virtual disk by an administrator and ensures that objects created for such virtual disk blueprints are configured to meet storage profile or policy requirements set by the administrator. In addition to being accessed during object creation (e.g., for virtual disks), CLOM sub-module 325 may also be accessed (e.g., to dynamically revise or otherwise update a virtual disk blueprint or the mappings of the virtual disk blueprint to actual physical storage in object store 116) on a change made by an administrator to the storage profile or policy relating to an object or when changes to the cluster or workload result in an object being out of compliance with a current storage profile or policy.

In one embodiment, if an administrator creates a storage profile or policy for a composite object such as virtual disk object 200, CLOM sub-module 325 applies a variety of heuristics and/or distributed algorithms to generate virtual disk blueprint 215 that describes a configuration in cluster 110 that meets or otherwise suits the storage policy (e.g., RAID configuration to achieve desired redundancy through mirroring and access performance through striping, which nodes' local storage should store certain portions/partitions/stripes of the virtual disk to achieve load balancing, etc.). For example, CLOM sub-module 325, in one embodiment, is responsible for generating blueprint 215 describing the RAID 1/RAID 0 configuration for virtual disk object 200 in FIG. 2 when the virtual disk was first created by the administrator. As previously discussed, a storage policy may specify requirements for capacity, IOPS, availability, and reliability. Storage policies may also specify a workload characterization (e.g., random or sequential access, I/O request size, cache size, expected cache hit ration, etc.). Additionally, the administrator may also specify an affinity to VSAN module 114 to preferentially use certain nodes 111 (or the local disks housed therein). For example, when provisioning a new virtual disk for a VM, an administrator may generate a storage policy or profile for the virtual disk specifying that the virtual disk have a reserve capacity of 400 GB, a reservation of 150 read IOPS, a reservation of 300 write IOPS, and a desired availability of 99.99%. Upon receipt of the generated storage policy, CLOM sub-module 325 consults the in-memory metadata database maintained by its VSAN module 114 to determine the current state of cluster 110 in order generate a virtual disk blueprint for a composite object (e.g., the virtual disk object) that suits the generated storage policy. As further discussed below, CLOM sub-module 325 may then communicate the blueprint to its corresponding distributed object manager (DOM) sub-module 340 which interacts with object space 116 to implement the blueprint by, for example, allocating or otherwise mapping component objects (e.g., stripes) of the composite object to physical storage locations within various nodes 111 of cluster 110.

In addition to CLOM sub-module 325 and DOM sub-module 340, as further depicted in FIG. 3, VSAN module 114 may also include a cluster monitoring, membership, and directory services (CMMDS) sub-module 335 that maintains the previously discussed in-memory metadata database to provide information on the state of cluster 110 to other sub-modules of VSAN module 114 and also tracks the general "health" of cluster 110 by monitoring the status, accessibility, and visibility of each node 111 in cluster 110. The in-memory metadata database serves as a directory service that maintains a physical inventory of the VSAN environment, such as the various nodes 111, the storage resources in the nodes 111 (SSD, magnetic disks, etc.) housed therein and the characteristics/capabilities thereof, the current state of the nodes 111 and there corresponding storage resources, network paths among the nodes 111, and the like. As previously discussed, in addition to maintaining a physical inventory, the in-memory metadata database further provides a catalog of metadata for objects stored in object store 116 (e.g., what composite and component objects exist, what component objects belong to what composite objects, which nodes serve as "coordinators" or "owners" that control access to which objects, quality of service requirements for each object, object configurations, the mapping of objects to physical storage locations, etc.). As previously discussed, other sub-modules within VSAN module 114 may access CMMDS sub-module 335 (represented by the connecting lines in FIG. 3) for updates to learn of changes in cluster topology and object configurations. For example, as previously discussed, during virtual disk creation, CLOM sub-module 325 accesses the in-memory metadata database to generate a virtual disk blueprint, and in order to handle an I/O operation from a running VM 112, DOM sub-module 340 accesses the in-memory metadata database to determine the nodes 111 that store the component objects (e.g., stripes) of a corresponding composite object (e.g., virtual disk object) and the paths by which those nodes are reachable in order to satisfy the I/O operation.

In addition, CMMDS sub-module 335 includes a protocol for electing a "master" node 111 within cluster 110. Upon creation of the cluster, CMMDS sub-module 335 elects a "master" node 111. "Master" node 111 is responsible for making distributed updates to the directory services of other nodes 111 in cluster 110 and assigning owner nodes 111 to composite objects 200. The elected "master" node 111 also appoints a backup node 111 to become the "master" node 111 if the current master node 111 fails.

As previously discussed, DOM sub-module 340, during the handling of I/O operations as well as during object creation, controls access to and handles operations on those component objects in object store 116 that are stored in the local storage of the particular node 111 in which DOM sub-module 340 runs as well as certain other composite objects for which its node 111 has been currently designated as the "coordinator" or "owner." For example, when handling an I/O operation from a VM, due to the hierarchical nature of composite objects in certain embodiments, a DOM sub-module 340 that serves as the coordinator for the target composite object (e.g., the virtual disk object that is subject to the I/O operation) may need to further communicate across the network with a different DOM sub-module 340 in a second node 111 (or nodes) that serves as the coordinator for the particular component object (e.g., stripe, etc.) of the virtual disk object that is stored in the local storage of the second node 111 and which is the portion of the virtual disk that is subject to the I/O operation. If the VM issuing the I/O operation resides on a node 111 that is also different from the coordinator of the virtual disk object, the DOM sub-module 340 of the node running the VM would also have to communicate across the network with the DOM sub-module 340 of the coordinator. In owner mode, DOM sub-module 340 coordinates all transactions performed on a component object 220, serving as a commit coordinator for each transaction. DOM sub-module 340 assigns a sequence number for every distributed operation so that the transaction entries in the journals of various component objects can be collated during recovery. In certain embodiments, if the VM issuing the I/O operation resides on node that is different from the coordinator of the virtual disk object subject to the I/O operation, the two DOM sub-modules 340 of the two nodes may to communicate to change the role of the coordinator of the virtual disk object to the node running the VM (e.g., thereby reducing the amount of network communication needed to coordinate I/O operations between the node running the VM and the node serving as the coordinator for the virtual disk object).

DOM sub-modules 340 also similarly communicate amongst one another during object creation. For example, a virtual disk blueprint generated by CLOM module 325 during creation of a virtual disk may include information that designates which nodes 111 should serve as the coordinators for the virtual disk object as well as its corresponding component objects (stripes, etc.). Each of the DOM sub-modules 340 for such designated nodes is issued requests (e.g., by the DOM sub-module 340 designated as the coordinator for the virtual disk object or by the DOM sub-module 340 of the node generating the virtual disk blueprint, etc. depending on embodiments) to create their respective objects, allocate local storage to such objects (if needed), and advertise their objects to their corresponding CMMDS sub-module 335 in order to update the in-memory metadata database with metadata regarding the object. In order to perform such requests, DOM sub-module 340 interacts with a log structured object manager (LSOM) sub-module 350 that serves as the component in VSAN module 114 that actually drives communication with the local SSDs and magnetic disks of its node 111. In addition to allocating local storage for component objects (as well as to store other metadata such a policies and configurations for composite objects for which its node serves as coordinator, etc.), LSOM sub-module 350 additionally monitors the flow of I/O operations to the local storage of its node 111.

Further, LSOM sub-module 350 maintains the journals of the component objects $220_X$. More specifically, LSOM sub-module 350 maintains a journal on each disk that incorporates cluster membership sequence numbers and object update configuration identifiers to allow updates to distributed objects composed of two or more LSOM components to be reconciled after a failure or partition. LSOM sub-module 350 labels storage objects with UUIDs so that the disks can be rejoined to the cluster, even if the storage objects are relocated to other nodes 111 (e.g., in event of a node failure).

FIG. 3 also depicts a reliable datagram transport (RDT) sub-module 345 that delivers datagrams of arbitrary size between logical endpoints (e.g., nodes, objects, etc.), where the endpoints may potentially be over multiple paths. In one embodiment, the underlying transport is TCP. Alternatively, other transports such as RDMA may be used. RDT sub-module 345 is used, for example, when DOM sub-modules 340 communicate with one another, as previously discussed above to create objects or to handle I/O operations. In certain embodiments, RDT module 345 interacts with CMMDS module 335 to resolve the address of logical endpoints dynamically in order to maintain up-to-date location information in the in-memory metadata database as well as to create, remove, or reestablish connections based on link health status. For example, if CMMDS module 335 reports a link as unhealthy, RDT sub-module 345 may drop the connection in favor of a link in better condition.

Figure 4:
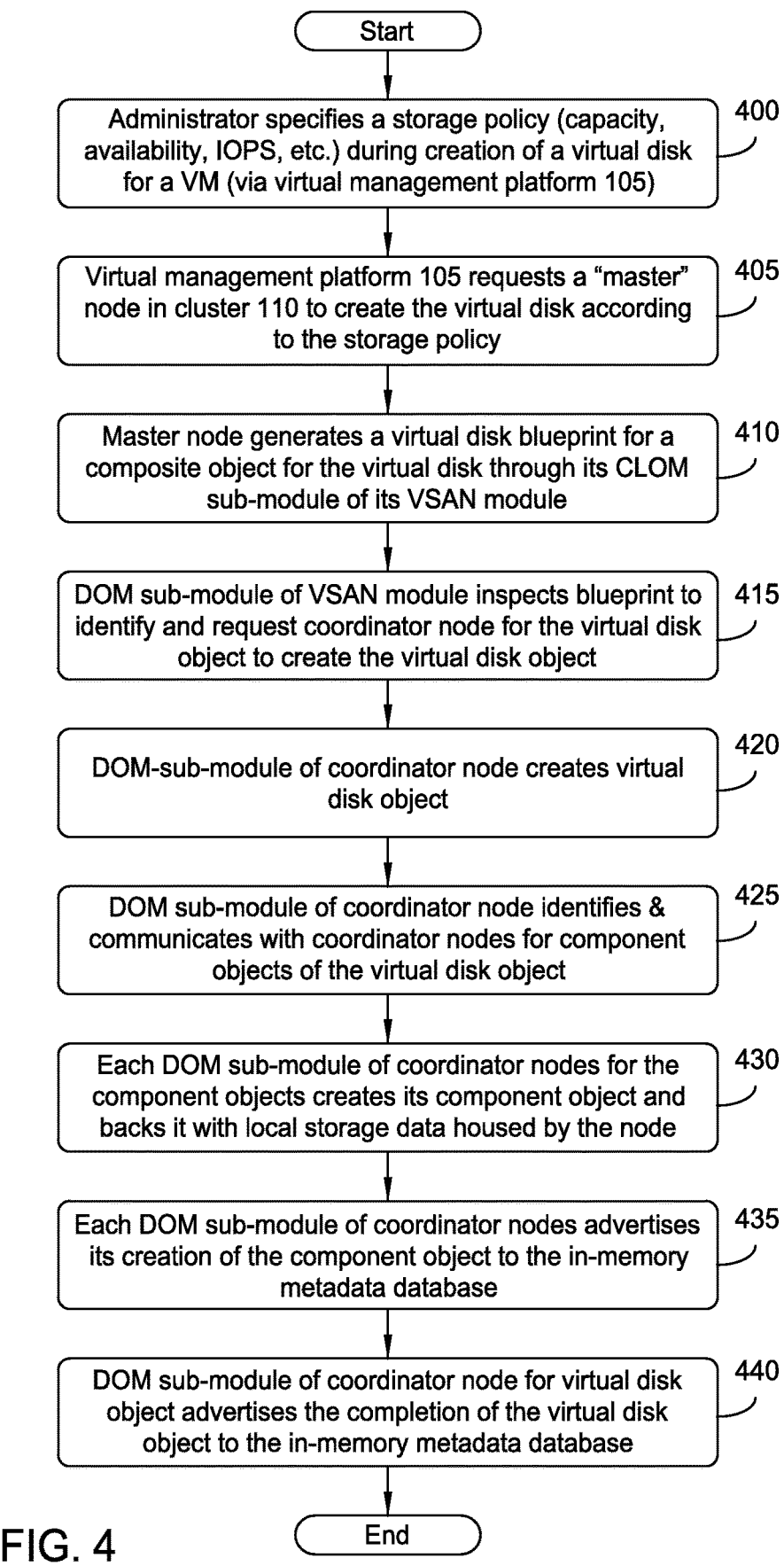
FIG. 4 illustrates a method flow diagram for creating a virtual disk object based on a defined storage policy, according to one embodiment, according to one embodiment.

FIG. 4 illustrates a method flow diagram for creating a virtual disk object based on a defined storage policy, according to one embodiment. For example, in step 400, an administrator may interact with a user interface of virtual management platform 105 to create a virtual disk having capacity, availability and IOPS requirements (e.g., the defined storage policy). In one embodiment, virtual management platform 105 may then request a "master" node 111 to create an object for the virtual disk in step 405. In step 410, such a master node 111 may generate a virtual disk blueprint through its CLOM sub-module 325 in VSAN module. As previously discussed, CLOM sub-module 35 generates a virtual disk blueprint for the creation of a virtual disk object (e.g., a composite object) based on the status of cluster 110 as determined by consulting the in-memory metadata database of CMMDS sub-module 335. In step 415, the DOM sub-module 340 of the master node 111 may the request the DOM sub-module 340 of the identified node to create the virtual disk object. In step 420, the DOM sub-module 340 of the identified node receives the request and creates the virtual disk object, by, for example, communicating with its corresponding the LSOM sub-module 350 to persistently store metadata describing the virtual disk object in its local storage. In step 425, the DOM sub-module 340, based on the virtual disk object blueprint, identifies other nodes in cluster 110 in the virtual disk blueprint. The DOM sub-module 340 communicates (e.g., using its RDT sub-module 345) with the DOM sub-modules 340 of the other nodes that will serve as coordinators for the component objects and store the data backing such component objects in their local storage. When such DOM sub-modules 340 receive a request from the DOM sub-module 340 of the coordinator of the virtual disk object to create their respective component objects, they, in turn in step 430, communicate with their respective LSOM modules 350 to allocate local storage for the component object (and its related metadata). Once such component objects have been created, their DOM sub-modules 340 advertise the creation of the components to the in-memory metadata database of its CMMDS sub-module 335 in step 435. In step 440, in turn, the DOM sub-module 340 for the coordinator of the virtual disk object also advertises its creation to its CMMDS sub-module 335 to update the in-memory metadata database and ultimately transmits an acknowledgement to the administrator (e.g., via the master node communications back to virtual management platform 105).

Figure 5:
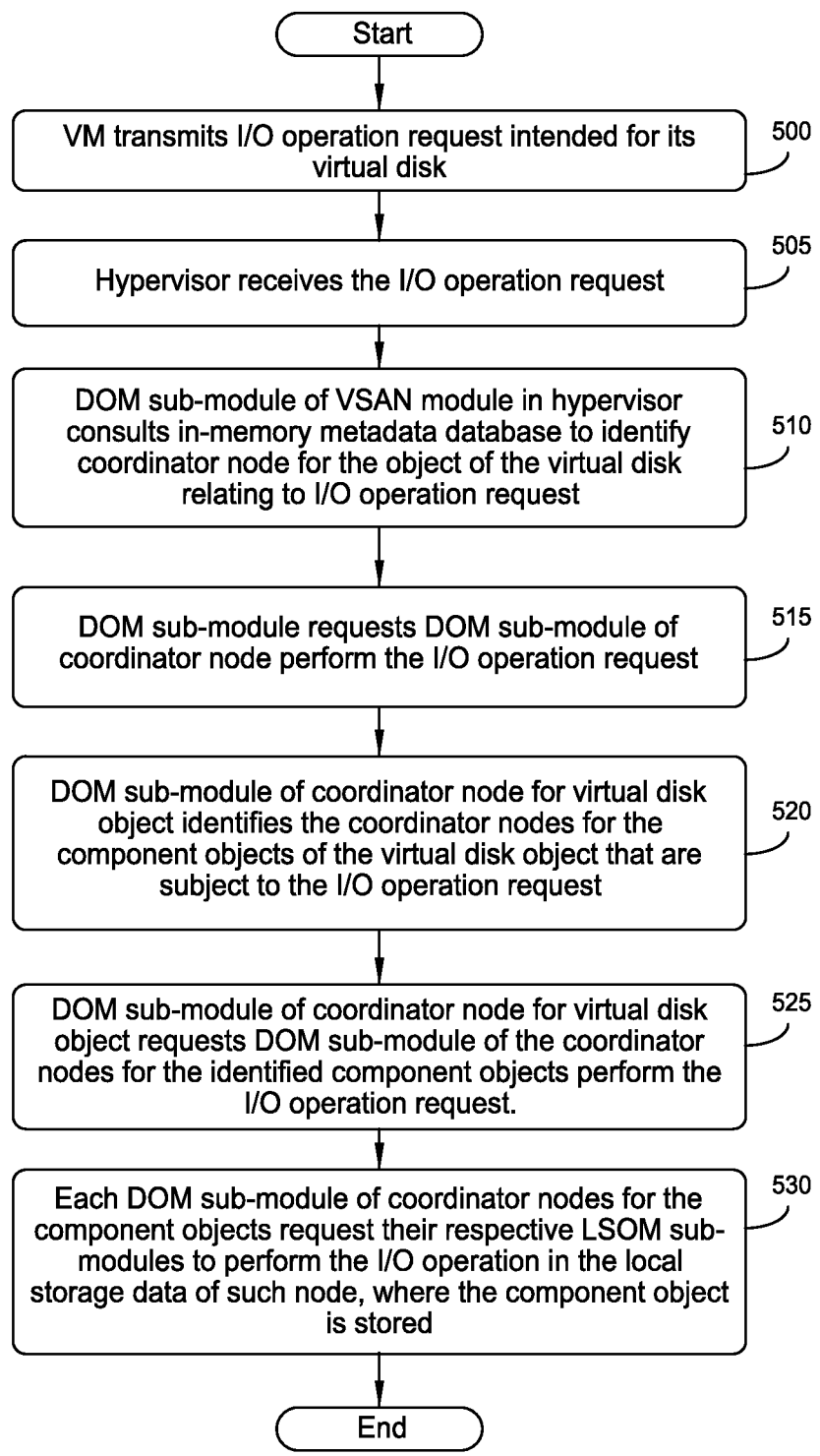
FIG. 5 illustrates the handling of an I/O operation originating from a VM, according to one embodiment.

FIG. 5 illustrates the handling of an I/O operation originating from a VM, according to one embodiment. When a VM running on a particular node performs I/O operations to its virtual disk, the VM's guest operating system, in step 500, transmits an I/O operation request intended for its virtual disk (through a device driver of the guest operating system) which, in step 505, is received by hypervisor 113 and ultimately transmitted and transformed through various layers of an I/O stack in hypervisor 113 to DOM sub-module 340 of VSAN module 114. In step 510, the I/O request received by DOM sub-module 340 includes a unique identifier for an object representing the virtual disk that DOM sub-module 340 uses to identify the coordinator node of the virtual disk object by accessing the in-memory metadata database of CMMS sub-module 335 (in certain embodiments, accessing the in-memory metadata database to look up a mapping of the identity of the coordinator node to the unique identifier occurs only when the virtual disk object is initially accessed, with such mapping persisting for future I/O operations such that subsequent lookups are not needed). Upon identifying the coordinator node for the virtual disk object, the DOM sub-module 340 of the node running the VM communicates (e.g., using its RDT sub-module 345) with the DOM sub-module 340 of the coordinator node to request that it perform the I/O operation in step 515. As previously discussed, in certain embodiments, if the node running the VM and the node serving as coordinator of the virtual disk object are different, the two DOM sub-modules will communicate to update the role of the coordinator of the virtual disk object to be the node of the running VM. Upon the coordinator's receipt of the I/O request, in step 520, its DOM sub-module identifies (e.g., by again referencing the in-memory metadata database, in certain embodiments) those coordinator nodes for the particular component objects (e.g., stripes) of the virtual disk object that are subject to the I/O operation. For example, if the I/O operation spans multiple stripes (e.g., multiple component objects) of a RAID 0 configuration, DOM sub-module 340 may split the I/O operation and appropriately transmit correspond I/O requests to the respective coordinate nodes for the relevant component objects that correspond to the two stripes. In step 525, the DOM sub-module of the coordinator node for the virtual disk object requests that the DOM sub-modules for the coordinator nodes of the identified component objects perform the I/O operation request and, in step 530, the DOM sub-modules of such coordinator nodes for the identified component objects interact with their corresponding LSOM sub-modules to perform the I/O operation in the local storage resource where the component object is stored.

In certain situations, it should be recognized that multiple VMs may simultaneously send requests to perform I/O operations on a particular local storage resource located in a particular node at any given time. For example, the component objects (e.g., stripes, etc.) of different virtual disk objects corresponding to different VMs may be backed by the same local storage on the same node. Upon receiving an I/O operation, the VSAN module 114 of such a node may place the I/O operation into a storage resource queue for processing.

Figure 6:
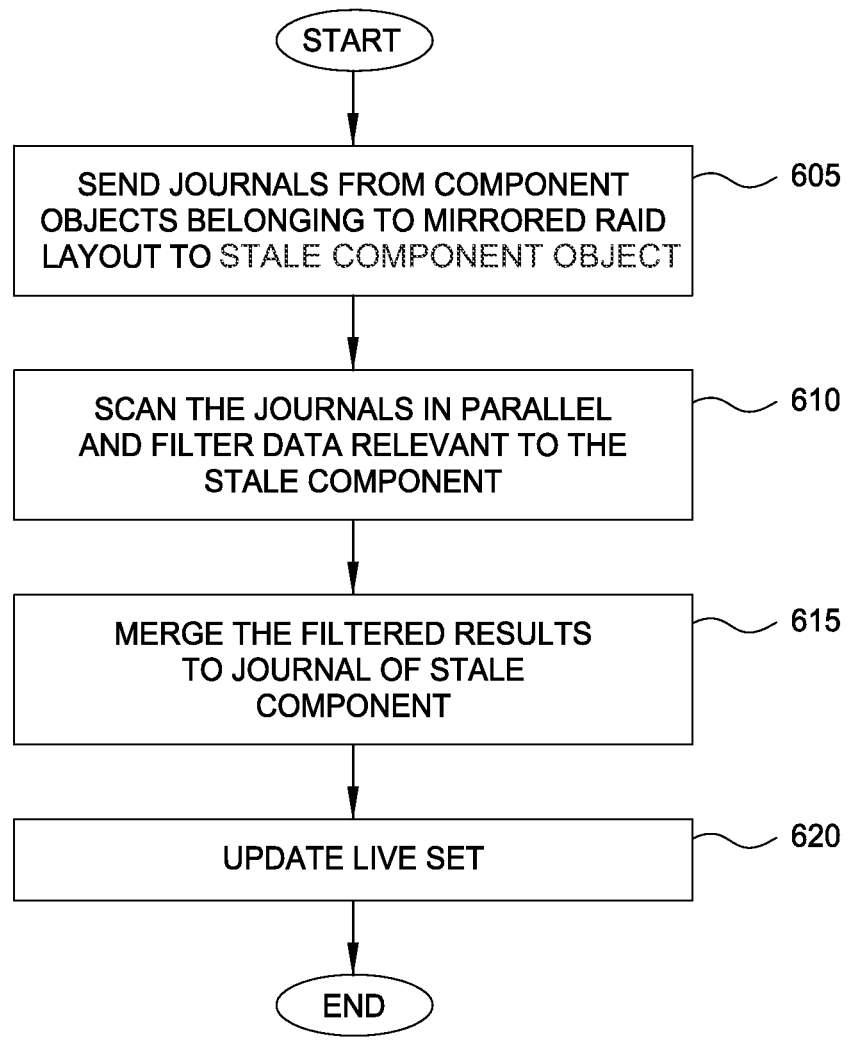
FIG. 6 illustrates a method for updating a stale component using distributed transaction logs of live components belong to an adjoining RAID layout, according to one embodiment.

FIG. 6 illustrates a method for updating a distributed transaction log of each stale component object in a stale node using distributed transaction logs of component objects hosted on other nodes using a RAID layout as a source, according to one embodiment. As stated, stale component objects are unable to rejoin the configuration and perform operations until the transaction entries in the component object journals are up-to-date.

The method begins at step 605, where the VSAN module 114 of the node 111 corresponding to the owner DOM sub-module 340 sends the journals from the live nodes 111 that have data corresponding to any stale component object to the given stale component object 220. To do this, the node 111 (through DOM sub-module 340) communicates with LSOM sub-modules 350 of corresponding nodes 111 to retrieve the journals. For example, assume that the RAID-1 configuration of a particular composite object includes a five-way RAID-0 in one arm and a four-way RAID-0 in the other. Suppose that one component from the four-way RAID-0 goes offline for a brief period and returns. In this case, the now-stale component object may not have received any updates during the downtime. However, the node 111 hosting the stale component object 220 can use the distributed transaction logs in each of the five components of the five-way RAID-0 configuration as a source to recover the stale component.

At step 610, VSAN module 114 applies any missing changes to each stale component object 220. Continuing the previous example, it follows that not all of the transactions of the component logs are applicable to the stale component object. Therefore, VSAN module 114 scans the journals in parallel while filtering relevant source bits by address range. At step 615, VSAN module 114 merges the results with the transaction log of the stale component. The owner DOM sub-module 340 communicates with the LSOM sub-modules 350 of the nodes 111 in the mirrored RAID configuration and copies the respective blocks from the corresponding component objects 220. Once the journal has been updated, in step 615, VSAN module 114 propagates the update to the cluster. The "master" node 111 updates the live set, and the returning component objects on node 111 rejoin the current live set configuration.

In sum, embodiments of the present disclosure provide techniques for recovery of previously offline component objects using distributed transaction logs on separate RAID layouts. Advantageously, the techniques provide further continuous data protection of object components using mirrored configurations. Additionally, using the live set model assures a single chain of authoritative memberships from which to resolve distributed transactions given partitions and other failures.

Generally speaking, the various embodiments described herein may employ various computer-implemented operations involving data stored in computer systems. For example, these operations may require physical manipulation of physical quantities usually, though not necessarily, these quantities may take the form of electrical or magnetic signals where they, or representations of them, are capable of being stored, transferred, combined, compared, or otherwise manipulated. Further, such manipulations are often referred to in terms, such as producing, identifying, determining, or comparing. Any operations described herein that form part of one or more embodiments may be useful machine operations. In addition, one or more embodiments also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments may be implemented as one or more computer programs or as one or more computer program modules embodied in one or more computer readable media. The term computer readable medium refers to any data storage device that can store data which can thereafter be input to a computer system computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs), CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

In addition, while described virtualization methods have generally assumed that virtual machines present interfaces consistent with a particular hardware system, the methods described may be used in conjunction with virtualizations that do not correspond directly to any particular hardware system. Virtualization systems in accordance with the various embodiments, implemented as hosted embodiments, non-hosted embodiments, or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of one or more embodiments. In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

What is claimed is:

1. A computer-implemented method comprising:
   receiving an input/output (I/O) operation request from a virtual machine at a hypervisor of a host computer node, the I/O operation request for a corresponding virtual disk of the virtual machine, wherein the virtual disk is associated with a distributed storage system;
   determining particular resource component objects of the virtual disk that are subject to the I/O operation, wherein each resource component object is associated with particular physical storage resources of the distributed storage system;
   performing a plurality of distributed transactions on the particular resource component objects to carry out the I/O operation;
   logging each transaction in a journal for each respective resource component object, wherein each entry includes a sequence identifier; and
   reconciling the entries on different journals such that lost transactions from an offline resource component object are derived from comparing the content of the journals using the respective sequence identifiers.

2. The computer-implemented method of claim 1, wherein the I/O request includes an identifier for an object representing the virtual disk, wherein the hypervisor uses the identifier to identify a coordinator node of the virtual disk object for carrying out the I/O request.

3. The computer-implemented method of claim 1, wherein the particular resource component objects are hosted on one or more host computer nodes in a cluster.

4. The computer-implemented method of claim 1, wherein active resource component objects of the particular resource component objects correspond to a mirrored redundant array of independent disks (RAID) configuration.

5. The computer-implemented method of claim 1, further comprising:
   determining that one of the particular resource component objects is stale; and
   using the content of the journals to resynchronize the stale resource component object.

6. The computer-implemented method of claim 5, wherein using the content of the journals to resynchronize the state resource component object includes determining missing transactions for the stale resource component object using the sequence identifiers and applying any corresponding transactions to the state resource component object.

7. A system comprising:
   one or more computers and one or more storage devices on which are stored data that are operable, when executed by the one or more computers, to cause the one or more computers to perform operations comprising:
   receiving an input/output (I/O) operation request from a virtual machine at a hypervisor, the I/O operation request for a corresponding virtual disk of the virtual machine, wherein the virtual disk is associated with a distributed storage system;
   determining particular resource component objects of the virtual disk that are subject to the I/O operation, wherein each resource component object is associated with particular physical storage resources of the distributed storage system;
   performing a plurality of distributed transactions on the particular resource component objects to carry out the I/O operation;

logging each transaction in a journal for each respective resource component object, wherein each entry includes a sequence identifier; and reconciling the entries on different journals such that lost transactions from an offline resource component object are derived from comparing the content of the journals using the respective sequence identifiers.

8. The system of claim 7, wherein the I/O request includes an identifier for an object representing the virtual disk, wherein the hypervisor uses the identifier to identify a coordinator node of the virtual disk object for carrying out the I/O request.

9. The system of claim 7, wherein the particular resource component objects are hosted on one or more host computer nodes in a cluster.

10. The system of claim 7, wherein active resource component objects of the particular resource component objects correspond to a mirrored redundant array of independent disks (RAID) configuration.

11. The system of claim 7, further comprising:
determining that one of the particular resource component objects is stale; and
using the content of the journals to resynchronize the stale resource component object.

12. The system of claim 11, wherein using the content of the journals to resynchronize the state resource component object includes determining missing transactions for the stale resource component object using the sequence identifiers and applying any corresponding transactions to the state resource component object.

13. A non-transitory computer-readable storage medium storing instructions, which, when executed on a processor, performs operations comprising:
receiving an input/output (I/O) operation request from a virtual machine at a hypervisor, the I/O operation request for a corresponding virtual disk of the virtual machine, wherein the virtual disk is associated with a distributed storage system;
determining particular resource component objects of the virtual disk that are subject to the I/O operation, wherein each resource component object is associated with particular physical storage resources of the distributed storage system;
performing a plurality of distributed transactions on the particular resource component objects to carry out the I/O operation;
logging each transaction in a journal for each respective resource component object, wherein each entry includes a sequence identifier; and
reconciling the entries on different journals such that lost transactions from an offline resource component object are derived from comparing the content of the journals using the respective sequence identifiers.

14. The non-transitory computer-readable storage medium of claim 13, wherein the I/O request includes an identifier for an object representing the virtual disk, wherein the hypervisor uses the identifier to identify a coordinator node of the virtual disk object for carrying out the I/O request.

15. The non-transitory computer-readable storage medium of claim 13, wherein the particular resource component objects are hosted on one or more host computer nodes in a cluster.

16. The non-transitory computer-readable storage medium of claim 13, wherein active resource component objects of the particular resource component objects correspond to a mirrored redundant array of independent disks (RAID) configuration.

17. The non-transitory computer-readable storage medium of claim 13, further comprising:
determining that one of the particular resource component objects is stale; and
using the content of the journals to resynchronize the stale resource component object.

18. The non-transitory computer-readable storage medium of claim 17, wherein using the content of the journals to resynchronize the state resource component object includes determining missing transactions for the stale resource component object using the sequence identifiers and applying any corresponding transactions to the state resource component object.

19. A system comprising:
one or more computers and one or more storage devices on which are stored data that are operable, when executed by the one or more computers, to cause the one or more computers to perform operations comprising:
preventing previously offline resource component objects in a distributed system from servicing operations if the resource component objects are stale, the system performing transactions without the resource component objects, the resource component objects to be resynchronized from other online resource component objects, comprising:
when a resource component object goes offline and the system makes progress without it, persisting a record of the fact that it is offline on a majority of all online resource component objects, said majority being a majority of the total number of resource components;
maintaining information of which resource component objects are stale in the running system and using this information in deciding which resource component objects must participate in transactions;
upon regaining connectivity to the previously offline resource component objects, disallowing the stale resource component object from servicing operations until a resynchronization method is complete, wherein the resynchronization comprises obtaining transaction logs from one or more other online resource component objects, each transaction log including entries identifying actions performed on each of the one or more online resource component objects for each distributed transaction of the distributed system, and updating the resource component object based on the transaction logs; and
upon completion of the resynchronization, persisting on a majority of nodes the fact that the resource component object is no longer stale before allowing it to participate in transactions.

20. The system of claim 19, wherein a record that a resource component object is stale is persisted before any pending or new transactions that would otherwise require the offline resource component object are allowed to proceed.

21. The system of claim 20, wherein data is persisted in the form of a configuration containing state for each resource component object, the state indicating at least one of an active state or a stale state.

* * * * *